(12) United States Patent
Booth et al.

(10) Patent No.: US 12,331,717 B2
(45) Date of Patent: Jun. 17, 2025

(54) WIND TURBINE

(71) Applicant: Siemens Gamesa Renewable Energy A/S, Brande (DK)

(72) Inventors: James Kenneth Booth, Brande (DK); Saravanan Jayaraman, Ikast (DK); Morten Lauridsen Jensen, Aarhus N (DK); Simon Vyff Jensen, Tørring (DK); Kim Gade Nielsen, Herning (DK); Jens Otte, Langå (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/788,294

(22) Filed: Jul. 30, 2024

(65) Prior Publication Data

US 2025/0084825 A1     Mar. 13, 2025

(30) Foreign Application Priority Data

Sep. 11, 2023   (EP) .................................. 23196431

(51) Int. Cl.
*F03D 1/00*     (2006.01)
*F03D 15/20*    (2016.01)

(52) U.S. Cl.
CPC .............. *F03D 1/181* (2023.08); *F03D 1/141* (2023.08); *F03D 15/20* (2016.05); *F05B 2240/14* (2013.01); *F05B 2260/301* (2013.01)

(58) Field of Classification Search
CPC .......... F03D 1/181; F03D 1/141; F03D 80/00; F03D 80/80; F03D 80/88; F03D 80/881;

(Continued)

(56) References Cited

U.S. PATENT DOCUMENTS 7,360,310 B2 * 4/2008 Bagepalli ............... H02K 15/06
290/55
7,431,567 B1 * 10/2008 Bevington .............. F03D 80/50
416/61

(Continued)

FOREIGN PATENT DOCUMENTS

DE     102018005088 A1 *   1/2020
EP       2014917 A1         1/2009

(Continued)

OTHER PUBLICATIONS

EP_2740933_A1—English Translation (Year: 2014).*
DE_102018005088_A1—English Translation (Year: 2020).*

*Primary Examiner* — Brian P Wolcott

(57) ABSTRACT

A wind turbine includes a bedframe having a frame connection flange and shaft having a shaft connection flange, which is fixated to the frame connection flange. The frame connection flange includes through bores at an outer first frame radius, threaded blind bores at an intermediate second frame radius, threaded blind bores at an inner third frame radius. The shaft connection flange includes threaded blind bores at an outer first shaft radius that corresponds with the first outer frame radius, second through bores at an intermediate second shaft radius that corresponds with the intermediate second frame radius, and third through bores at an inner third shaft radius that corresponds with the inner third frame radius, wherein a through bore is flush with a threaded bore and a screw connection extends through the through bore and is screwed into the threaded blind bore.

9 Claims, 2 Drawing Sheets

(58) Field of Classification Search
CPC ...... F03D 1/101; F03D 15/20; F05B 2240/14; F05B 2260/301; F05B 2240/61
See application file for complete search history.

(56) References Cited

U.S. PATENT DOCUMENTS

| | | | | |
|---|---|---|---|---|
| 8,167,575 | B2* | 5/2012 | Eusterbarkey | F16D 1/033 416/248 |
| 8,994,205 | B2* | 3/2015 | Castell Martinez | F03D 15/20 290/55 |
| 9,206,743 | B2* | 12/2015 | Schnetgoke | F16D 1/076 |
| 12,006,910 | B2* | 6/2024 | Drots | F03D 15/20 |
| 2010/0171317 | A1* | 7/2010 | Trede | F03D 1/0658 290/55 |
| 2010/0264664 | A1 | 10/2010 | Lauke | |
| 2014/0348656 | A1 | 11/2014 | Huang et al. | |

FOREIGN PATENT DOCUMENTS

| | | | | |
|---|---|---|---|---|
| EP | 2063116 | A1 | 5/2009 | |
| EP | 2740933 | A1 * | 6/2014 | ............... F03D 1/00 |

* cited by examiner

WIND TURBINE

FIELD OF TECHNOLOGY

The disclosure refers to a wind turbine, comprising a hollow bedframe having a cylindrical frame connection flange with a frame front face and hollow shaft having a cylindrical shaft connection flange with a shaft front face, wherein the shaft connection flange is fixated to the frame connection flange by screw connections arranged in axially extending bores provided in the frame connection flange and the shaft connection flange.

SUMMARY

Modern wind turbines often comprise a direct drive generator, usually comprising an outer rotor and an inner stator, wherein the rotor is coupled to a hub comprising a number of rotor blades interacting with blowing wind. The rotating hub drives the rotor which rotates around the stator making the generator producing electric power, as commonly known. The wind turbine, among others, comprises a hollow shaft, which is stationary and which carries the stator and the rotor, which is arranged in respective bearings, so that the rotor is rotatable around the shaft and the stator. The hollow shaft is connected to a stationary bedframe, which is arranged on top of a tower, and which can be rotated around the longitudinal axis of the tower, so that the whole drive train can be adapted in its position. The hollow bedframe has a cylindrical frame connection flange with a frame front face. Also, the hollow shaft comprises a cylindrical shaft connection flange with a shaft front face. Both the bedframe and the hollow shaft are fixated to each other by appropriate screw connections arranged in axially extending bores provided in the respective frame and shaft connection flanges. These bores are arranged in various rows, some of which extend around 360° of the respective flange, some of which don't. These bores comprise through bores provided in one flange and corresponding threaded blind bores provided in the other flange, therein screws or bolts extend through the through bores and are screwed into the threaded blind bores. Further, these bores also comprise corresponding through bores in both flanges, therein a bolt extends through both through bores and is fixated with respective nuts screwed on both ends at both flange sides. A lot of machining, especially on the bedframe side, where different bores in up to four separate rows need to be drilled, is necessary. Also, the placing of the screws and bolts is quite cumbersome, especially at the bedframe side. There, screws need to be inserted in through bores of a row and need to be screwed in threaded blind bores of the shaft flange. Further, it is quite cumbersome to tighten the bolts extending through both through bores of the flanges from the bedframe side, which bolts needs to be tightened from the bedframe inner side by screwing the nuts, where sometimes only a limited space is given.

A wind turbine having an improved flange connection between the bedframe and the shaft is provided.

The frame connection flange is provided with a first row of first through bores extending from the frame front face to an opposite face of the frame connection flange and arranged at an outer first frame radius and the shaft connection flange is provided with a first row of first threaded blind bores extending from the shaft front face into the shaft connection flange and arranged at an outer first shaft radius which corresponds to the first outer frame radius, the frame connection flange is provided with a second row of second threaded blind bores extending from the frame front face into the frame connection flange and arranged at an intermediate second frame radius and the shaft connection flange is provided with a second row of second through bores extending from the shaft front face to an opposite face of the shaft connection flange and arranged at an intermediate second shaft radius which corresponds to the intermediate second frame radius, the frame connection flange is provided with a third row of third threaded blind bores extending from the frame front face into the frame connection flange and arranged at an inner third frame radius and the shaft connection flange is provided with a third row of third through bores extending from the shaft front face to an opposite face of the shaft connection flange and arranged at an inner third shaft radius which corresponds to the inner third frame radius, wherein a through bore is flush with a threaded bore and a screw connection extends through the through bore and is screwed into the threaded blind bore.

The wind turbine is provided with an improved flange connection between the bedframe and the shaft. This flange connection comprises only three rows of bores, provided in both the frame connection flange and the shaft connection flange. Each screw connection comprises two corresponding bores, i.e. one through bore and one threaded blind bore, and one screw which extends through the through bore and is screwed in the threaded blind bore. No flushing through bores receiving a bolt which needs to be tightened from both sides with nuts is provided.

The three rows comprise a first row, a second row and a third row. The first row comprises first through bores in the frame connection flange extending from the frame front face to an opposite face of the frame connection flange and first threaded blind bores in the shaft connection flange extending from the shaft front face into the shaft connection flange. Both bores are certainly arranged at the same radius, which is an outer first radius, so that the first through bores of the frame connection flange are arranged at an outer first frame radius and the first threaded blind bores of the shaft connection flange are arranged at an outer first shaft radius corresponding to the first outer frame radius. These combination of through bores and threaded blind bores build the first row. In this row the connection screws are inserted from the bedframe side through the through bores in the frame connection flange and are screwed into the threaded blind bores in the shaft connection flange.

The second row comprises second threaded blind bores in the frame connection flange, extending from the frame front face into the frame connection flange, which are arranged at an intermediate second frame radius. It further comprises second through bores in the shaft connection flange extending from the shaft front face to an opposite face of the shaft connection flange, which second through bores are arranged at an intermediate second shaft radius, which certainly corresponds to the intermediate second frame radius. In this row the connection screws are inserted from the shaft side through the through bores in the shaft connection flange and are screwed into the threaded blind bores in the frame connection flange.

Finally, the third row comprises third threaded blind bores in the frame connection flange, again, like the second threaded blind bores, extending from the frame front face into the frame connection flange, and third through bores in the shaft connection flange, again, extending from the shaft front face to an opposite face of the shaft connection flange. These bores are certainly arranged at a corresponding third radius, an inner third frame radius and an inner third shaft radius. Also, in this row the connection screws are inserted from the shaft side through the through bores in the shaft connection flange and are screwed into the threaded blind bores in the frame connection flange.

The screw connection therefore only comprises combinations of through bores and threaded blind bores and screw connections, wherein only one row, in which screws are inserted, is accessible from the bedframe side, different to the prior art, which makes the setting of the screws respectively the connections easier.

According to an embodiment, the frame connection flange is attached to a cylindrical bedframe part and the shaft connection flange is attached to a cylindrical shaft part, wherein the frame connection flange comprises a radially outer frame flange part and a radially inner flange part separated by the frame flange part and wherein the shaft connection flange comprises a radially outer frame flange part and a radially inner flange part separated by the shaft flange part, wherein the outer first frame radius is located in the radially outer frame part and the intermediate second shaft radius and the inner third shaft radius are located at the inner shaft flange part. The bedframe comprises a cylindrically bedframe part connected to the frame connection flange, which extends radially relative to the bedframe part, so that the frame connection flange comprises a radially outer frame flange part and a radially inner frame flange part. The same arrangement is provided at the shaft, which comprises a cylindrically shaft part, to which the shaft connection flange is attached, which extends radially relative to the shaft part with a radially outer shaft flange part and a radially inner shaft flange part. The first row of the bores, as depicted above, which are arranged at the outer first frame radius and the outer shaft radius, are provided in the respective outer frame flange part and outer shaft flange part, wherein the second and the third rows of the bores are arranged at the intermediate second frame radius and the intermediate second shaft radius (second row) respectively the inner third frame radius and the inner third shaft radius (third row). So, the screw connections of the outer first row, which, as mentioned, are inserted from the bedframe side, are inserted from outside of the bedframe, where there is sufficient space for inserting and tightening the screws. An easy screwing is possible. The screw connections, which are set at the intermediate and the inner bores are accessible from the inner side of the hollow shaft, which also allows for an easy screwing. No screwing is necessary from the inner bedframe site, which, as mentioned, is sometimes difficult, so that the EHS-statistics (EHS=Environment, Health and Safety) can be improved.

According to a preferred embodiment, the first, the second and the third rows extend around the whole circumference of the respective frame flange and shaft flange. All three rows extend around 360° and therefore describe complete and concentric circles. The bores in the respective rows are evenly distributed at equidistant positions. According to an alternative, only one or two of the first, the second and the third row extends around the whole circumference while the remaining row or rows extend only around a part of the circumference. According to this embodiment, only one or two rows describe a complete 360° circle, white the remaining one or two rows extend only around a part of the circumference, may be around 180° or 270°. So, different row settings respectively bore settings are possible, which may be adapted to the mechanical needs of the connection.

Preferably each screw connection comprises a threaded bolt-like screw screwed into the respective threaded bore and a nut screwed on the bolt and supported against the respective opposite side of the respective flange part. This type of screw connection allows for tightly screwing the bolt-like screw into the threaded bore for tightly fixating it in the threaded bore, whereafter a nut is screwed on the threaded bolt-like screw for firmly tightening it, as the nut, when screwed, is supported against the respective opposite side of the respective flange part.

According to a preferred embodiment, an intermediate ring-shaped plate is sandwiched between the frame front face and the shaft front face, wherein the screw connections extend through the plate in respective through bores being certainly flush with respective through bores and threaded bores of the rows). The frame front face and the shaft front face do not directly abut each other, but an intermediate ring-shaped plate is sandwiched between both front faces. The screw connections extend through the plate in respective bores, so that the intermediate plate is not only sandwiched between the front faces, but also fixated directly by means of the screw connections extending through the plate. Certainly, these plate through bores are flush with it respective through bores and threaded bores of the rows. This plate is an anti-ovalization plate reducing any possible ovalization of the flange connection due to the loads resting on the shaft and the bedframe. This intermediate plate further supports to keep any variations of the air gap between the rotor and the stator as less as possible.

Preferably, the plate, at least partly, extends further into the inner of the bedframe and the shaft than the frame connection flange and the shaft connection flange. This provides for a better stiffening of the flange area respectively the flange connection, while still a sufficiently large central opening is given allowing the maintenance staff to pass through this opening from the bedframe into the shaft.

The plate itself may comprise one or more further openings, except for the central opening. Such a further opening may for example be used for passing to any items like cables or the like through this area.

The intermediate plate is preferably made of steel, while the hollow shaft and the bedframe are preferably made of cast metal.

The wind turbine is preferably a direct drive turbine, it comprises a direct drive generator, preferably comprising an outer rotor and an inner stator.

BRIEF DESCRIPTION OF THE DRAWING

Other objects and features will become apparent from the following detailed description considered in conjunction with the accompanying drawings. The drawings, however, are only principle sketches designed solely for the purpose of illustration and do not limit the invention. The drawings show.

DETAILED DESCRIPTION

Figure 1:
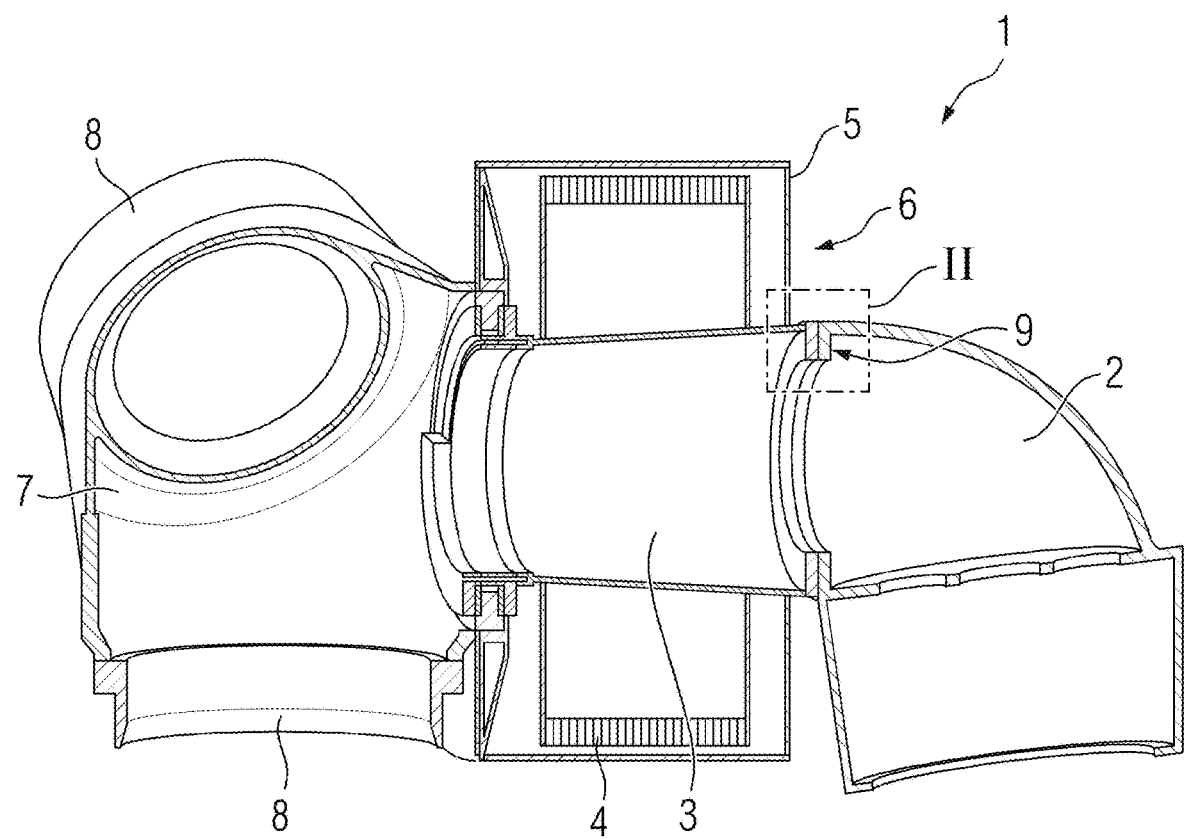
FIG. 1 a partial view of a wind turbine.

FIG. 1 shows a partial view of a wind turbine 1, comprising a hollow bedframe 2 fixated to a not shown tower. To the bedframe 2 a hollow shaft 3 is attached, which, like the bedframe 2, is also stationary. The stationary shaft 3 carries a stator 4, which is also stationary, and a rotor 5 which is, by respective bearings, rotatably arranged relative to the stator 4. The stator 4 and the rotor 5 are part of a generator 6 of the direct drive type. The rotor 5 is directly coupled to a hub 7, to which a number of rotor blades 8 is attached. When the wind blows, the rotor blades interact with the wind and start rotating, which rotation is transferred via the hub 7 to the directly coupled rotor 5, which rotates around the stationary stator 4, so that the generator 6 produces electric power, as commonly known.

Figure 2:
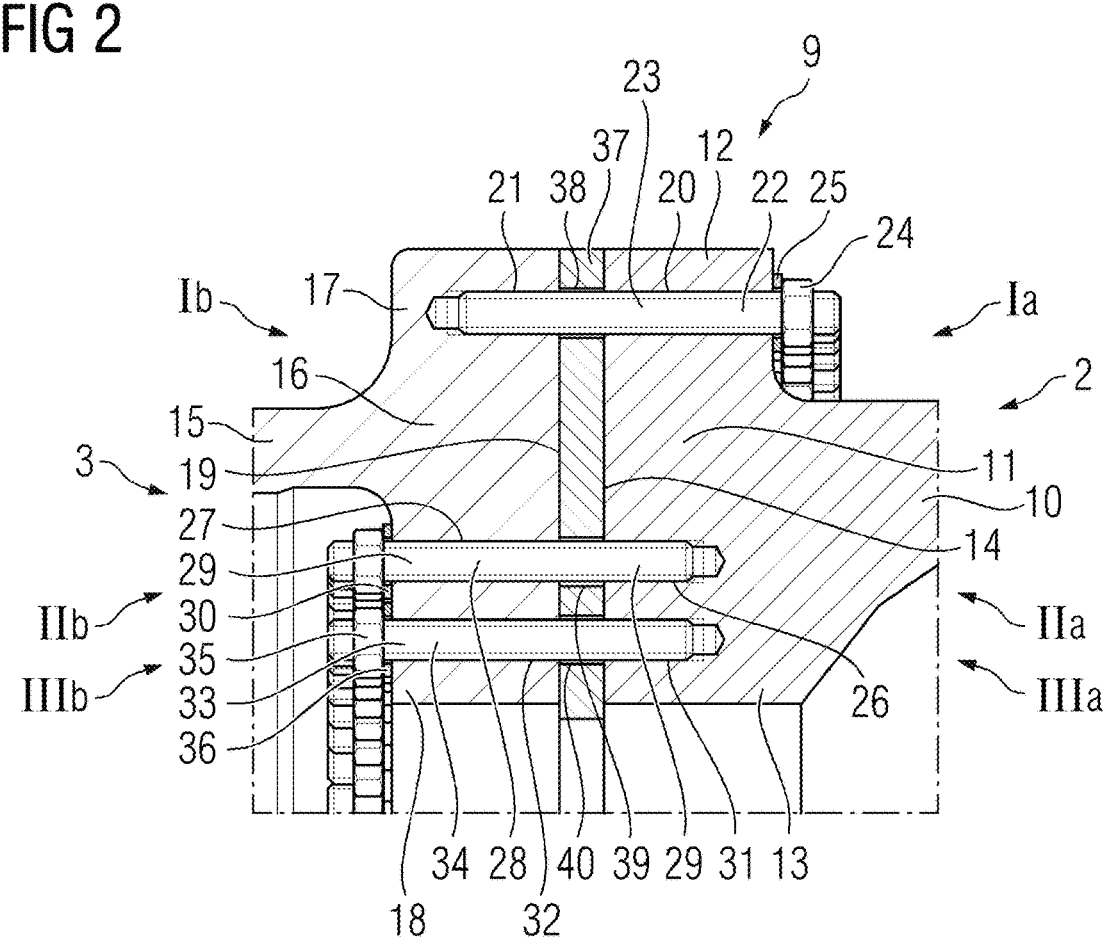
FIG. 2 the enlarged section II of FIG. 1 showing the flange connection between the bedframe and the shaft, and FIG. 3 a principal illustration of a wind turbine.

The bedframe 2 is connected to the shaft 3 by a flange connection 9, which is shown in detail in the enlarged view in FIG. 2. This partial view shows a part of the bedframe 2 and a part of the shaft 3. The bedframe 2 comprises a cylindrical frame part 10, to which a frame connection flange 11 is attached, it is a one-piece-construction. The frame connection flange 11 comprises a radially outer frame flange part 12 extending radially to the outside of the bedframe 2 and a radially inner frame flange part 13 extending to the inner of the bedframe 2. Further, the frame connection flange 11 comprises a frame front face 14, which, like the frame connection flange 11, is certainly also cylindrical.

The shaft 3 comprises a cylindrical shaft part 15, to which a shaft connection flange 16 is attached, it is a one-piece-construction. The shaft connection flange 15 comprises a radially outer shaft flange part 17 extending radially to the outside of the shaft 3 and a radially inner shaft flange part 18 extending to the inner of the shaft 3. Further, the shaft connection flange 16 comprises a shaft front face 19, which, like the shaft connection flange 16, it is also cylindrical.

The flange connection 9 shown in FIG. 2, which is at the downwind side, comprises a specific arrangement of various bores, which are arranged in three rows. These rows comprise through bores provided in one connection flange and threaded blind bores provided in the other connection flange.

In detail, the frame connection shaft 11 comprises in the outer frame flange part 12 a first row Ia comprising first through bores 20, which are provided at an outer first frame radius. In the opposite shaft connection flange 16 a first row Ib comprising first threaded blind bores 21 is provided in the outer shaft flange part 17, which first threaded blind bores 21 are provided at an outer first shaft radius, wherein the first shaft radius corresponds to the first frame radius. A screw connection 22 comprising a threaded bolt-like screw 23 is inserted into the first through bore 20 and screwed into the first threaded bore 21. A nut 24 and a washer 25 are arranged at the threaded free end of the screw 23, wherein the nut 24 is tightened in order to tighten the screw connection and to firmly fixated both flange is.

Further, the frame connection shaft 11 comprises in the inner frame flange part 13 a second row IIa comprising the second threaded blind bores 26, which are provided at an intermediate second frame radius. In the opposite shaft connection flange 16 a second row IIb comprising second through bores 27 is provided in the inner shaft flange part 17, which second through bores 27 are provided at an intermediate second shaft radius, wherein the second shaft radius corresponds to the second frame radius. A screw connection 28 comprising a threaded bolt-like screw 29 is inserted into the second through bore 27 and screwed into the second threaded bore 26. A nut 29 and a washer 30 are arranged at the threaded free end of the screw 28, wherein the nut 29 is tightened in order to tighten the screw connection and to firmly fixate both flanges.

Finally, the frame connection shaft 11 comprises in the inner flange part 13 a third row IIIa comprising the third threaded blind bores 31, which are provided at an inner third frame radius. In the opposite shaft connection flange 16 a third row IIIb comprising third through bores 32 is provided in the inner shaft flange part 17, which third through bores 32 are provided at an inner third shaft radius, wherein the third shaft radius corresponds to the third frame radius. A screw connection 33 comprising a threaded bolt-like screw 34 is inserted into the third through bore 32 and screwed into the third threaded bore 31. A nut 35 and a washer 36 are arranged at the threaded free end of the screw 34, wherein the nut 35 is tightened in order to tighten the screw connection and to firmly fixate both flanges.

Between both flanges 11, 16, an intermediate ring-shaped plate 37 is sandwiched between the frame front face 14 and the shaft front face 19, wherein the respective screw connections 23, 28 and 33 extend through the plate 37 in respective through bores 38, 39 and 40 provided in the plate 37 at exactly the first, second and third radius. This plate 37, which is preferably made of steel, has an anti-ovalization purpose, as it stiffens the flange connection 9 against any ovalizaton resulting from any loads resting on the flange connection 9. By this stiffening also the dimension of the air gap provided between the stator 4 and the rotor 5 is maintained.

As FIG. 2 shows, the flange connection comprises only combinations of one through bore and one corresponding, flush threaded blind bore in each row. Therefore, in each flange 11, 16 only three bores, seen at one circumferential position, needs to be drilled, which is less elaborate compared to known flange connections of a bedframe to a shaft.

All three rows may extend completely around 360° around the respective flange 11, 16. In an alternative, it is possible, that only row or two rows extent over 360°, while the remaining rows extend only around a part of the circumference, for example around 180° or 270°, whatever is needed in view of the mechanical requests.

Figure 3:
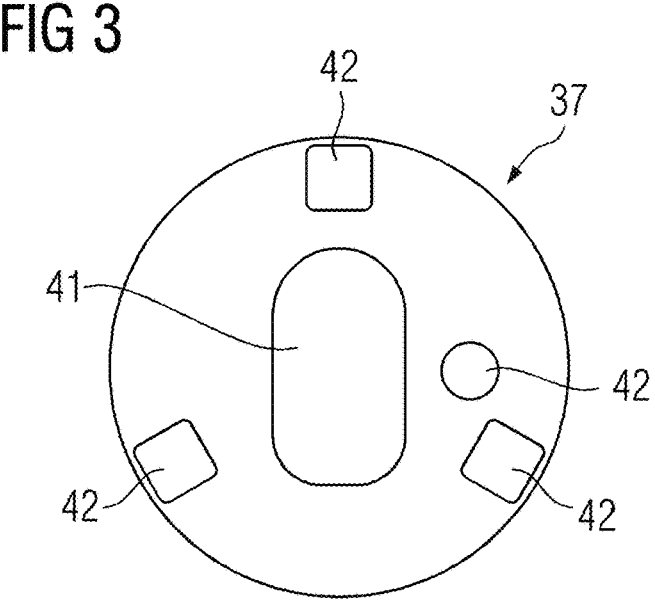

FIG. 3 shows a principal illustration of the intermediate plate 37, which, as mentioned, is ring-shaped. It comprises a central opening 41, through which maintenance staff can pass from the bedframe to the shaft. The design of the opening 41 is such, that the plate 37 extends further into the inner of the bedframe 2 respectively the shaft 3 than the flanges 11, 16. By this protrusion the stiffening effect can further be enhanced. Further openings 42 may be provided, if need be, through which openings items like cables or the like may be passed.

Although the present invention has been described in detail with reference to the preferred embodiment, the present invention is not limited by the disclosed examples from which the skilled person is able to derive other variations without departing from the scope of the invention.

Independent of the grammatical term usage, individuals with male, female or other gender identities are included within the term.

The invention claimed is:

1. A wind turbine, comprising a hollow bedframe (2) having a cylindrical frame connection flange (11) with a frame front face (14) and hollow shaft (3) having a cylindrical shaft connection flange (16) with a shaft front face (19), wherein the shaft connection flange (16) is fixated to the frame connection flange (11) by screw connections arranged in axially extending bores provided in the frame connection flange (11) and the shaft connection flange (15), characterized in that
   the frame connection flange (11) is provided with a first row (Ia) of first through bores (20) extending from the frame front face (14) to an opposite face of the frame connection flange (11) and arranged at an outer first frame radius and the shaft connection flange (16) is provided with a first row (Ib) of first threaded blind bores (21) extending from the shaft front face (19) into the shaft connection flange (16) and arranged at an outer first shaft radius which corresponds to the first outer frame radius, the frame connection flange (11) is provided with a second row (IIa) of second threaded blind bores (26) extending from the frame front face (14) into the frame connection flange (11) and arranged at an intermediate second frame radius and the shaft connection flange (16) is provided with a second row (IIb) of second through bores (27) extending from the shaft front face (19) to an opposite face of the shaft connection flange (16) and arranged at an intermediate second shaft radius which corresponds to the intermediate second frame radius, the frame connection flange (11) is provided with a third row (IIIa) of third threaded blind bores (31) extending from the frame front face (14) into the frame connection flange (11) and arranged at an inner third frame radius and the shaft connection flange (16) is provided with a third row (IIIb) of third through bores (32) extending from the shaft front face (19) to an opposite face of the shaft connection flange (16) and arranged at an inner third shaft radius which corresponds to the inner third frame radius, wherein a through bore (20, 27, 32) is flush with a threaded bore (21, 26, 31) and a screw connection (22, 28, 33) extends through the through bore (20, 27, 32) and is screwed into the threaded blind bore (21, 26, 31).

2. The wind turbine according to claim 1, characterized in that the frame connection flange (11) is attached to a cylindrical bedframe part (10) and the shaft connection flange (16) is attached to a cylindrical shaft part (15), wherein the frame connection flange (11) comprises a radially outer frame flange part (12) and a radially inner frame flange part (13) separated by the frame flange part (10) and wherein the shaft connection flange (16) comprises a radially outer shaft flange part (17) and a radially inner shaft flange part (18) separated by the shaft flange part (15), wherein the outer first frame radius is located in the radially outer frame part (12) and the intermediate second shaft radius and the inner third shaft radius are located at the inner shaft flange part (18).

3. The wind turbine according to claim 1, characterized in that the first, the second and the third rows (Ia, Ib, IIa, IIb, IIIA, IIIb) extend around the whole circumference of the respective frame connection flange (11) and shaft connection flange (16), or wherein only one or two of the first, the second and the third row (Ia, Ib, IIa, IIb, IIIA, IIIb) extends around the whole circumference while the remaining row or rows (Ia, Ib, IIa, IIb, IIIA, IIIb) extend only around a part of the circumference.

4. The wind turbine according to claim 1, characterized in that each screw connection (22, 28, 33) comprises a threaded bolt-like screw (23, 29, 34) screwed into the respective threaded bore (21, 26, 31) and a nut (24, 29, 36) screwed on the screw (23, 29, 34) and supported against the respective opposite side of the respective flange part (12, 18).

5. The wind turbine according to claim 1, characterized in that an intermediate ring-shaped plate (37) is sandwiched between the frame front face (14) and the shaft front face (19), wherein the screw connections (22, 28, 33) extend through the plate (37) in respective through bores.

6. The wind turbine according to claim 5, characterized in that the plate (37), at least partly, extends further into the inner of the bedframe (2) and the shaft (3) than the frame connection flange (11) and the shaft connection flange (16).

7. The wind turbine according to claim 5, characterized in that the plate (37) comprises one or more openings (42).

8. The turbine according to claim 5, characterized in that the plate (37) is made of steel.

9. The wind turbine according to claim 1, characterized in that it is a direct drive turbine.

* * * * *